United States Patent [19]

Deri et al.

[11] Patent Number: 4,943,133
[45] Date of Patent: Jul. 24, 1990

[54] LOW LOSS SEMICONDUCTOR OPTICAL PHASE MODULATOR

[75] Inventors: Robert J. Deri, Atlantic Highlands; Elyahou Kapon, Old Bridge Township, Middlesex County, both of N.J.

[73] Assignee: Bell Communications Research, Inc., Livingston, N.J.

[21] Appl. No.: 229,233

[22] Filed: Aug. 8, 1988

[51] Int. Cl.$^5$ .......................... G02B 6/10; G02F 1/00
[52] U.S. Cl. .............................. 350/96.14; 350/96.12; 350/355
[58] Field of Search .............. 350/96.12, 96.13, 96.14, 350/96.15, 355

[56] References Cited

U.S. PATENT DOCUMENTS

| 4,136,350 | 1/1979 | Tien | 350/96.14 X |
|---|---|---|---|
| 4,685,763 | 8/1987 | Tada et al. | 350/96.14 |
| 4,744,616 | 5/1988 | Robinson et al. | 350/96.14 |
| 4,793,677 | 12/1988 | Adams et al. | 350/96.14 |
| 4,840,446 | 6/1989 | Nakamura et al. | 350/96.14 X |

FOREIGN PATENT DOCUMENTS

| 0050518 | 3/1985 | Japan | 350/96.14 |
|---|---|---|---|
| 0212823 | 9/1986 | Japan | 350/96.14 |

OTHER PUBLICATIONS

"Attenuation Measurements on MOCVD-GROWN GaAs/GaAlAs Optical Waveguides", R. G. Walker et al., Electronics Letters, vol. 19, No. 15, pp. 590-592, Jul. 21, 1983.

"Reactive Ion Etched GaAs Optical Waveguide Modulators with Low Loss and High Speed", P. Buchmann et al., Electronics Letters, vol. 20, No. 7, pp. 295-297, Mar. 29, 1984.

"Low Loss GaAs Optical Waveguides Grown by the Metalorganic Chemical Vapor Deposition Method", K. Hiruma et al., Appl. Phys. Lett., vol. 47, No. 3, pp. 186-187, Aug. 1, 1985.

Primary Examiner—John D. Lee
Attorney, Agent, or Firm—James W. Falk

[57] ABSTRACT

A low loss optical waveguide modulator, an essential component of opto-electronic integrated circuits which can combine optical and electronic devices on a single chip optical communication systems is described. The modulator in our embodiment consists of a sequence of epitaxial layers on a single crystal substrate consisting of a $n^+$-GaAs substrate, a $n^+$-GaAs buffer layer, a n-$Al_{0.05}Ga_{0.95}As$ electrode layer, an effective i-$Al_{0.25}Ga_{0.75}As$ confinement layer, an i-GaAs guiding layer, an effective i-$Al_{0.25}Ga_{0.75}As$ confinement layer, a p-$Al_{0.25}Ga_{0.75}As$ electrode layer and a $p^+$-GaAs cap layer. The layers have an index of refraction profile such that the index of refraction of the confinement layers are substantially less than the index of refraction of the guiding layer and the index of refraction of the first electrode layer is substantially greater than the index of refraction of the first confinement layer.

16 Claims, 7 Drawing Sheets

LOW LOSS SEMICONDUCTOR OPTICAL PHASE MODULATOR

BACKGROUND OF THE INVENTION

1. Field of the Invention

This invention relates to a semiconductor optical phase modulator suitable for use in integrated electro-optical semiconductor devices. More particularly, the invention relates to a semiconductor optical modulator comprising a sequence of semiconductor layers having a refractive index profile which minimizes optical propagation loss through the waveguide without sacrificing modulator efficiency.

2. Description of the Prior Art

Semiconductor optical modulators have been described in the art previously. However, such prior art devices generally must trade-off between reducing optical propagation loss through the waveguide and increasing or maintaining modulator efficiency. That is, these prior art designs suffer either increased loss from optical absorption by modulator electrodes when increased efficiency is sought or reduced efficiency generally caused by increased separation of electrodes from the region of optical confinement when lower loss devices are sought. Also, the prior art devices were extremely limited in the optical mode size in single mode devices. Such mode size is critical for coupling single mode devices to optical fibers and the greater the mode size permitted the easier and more efficient the coupling to such optical fibers.

Typical optical propagation losses in prior art integrated optic waveguide devices on semiconductor substrates have been in the order of several dB/cm, which is unacceptable for many device applications. While recent advances in semiconductor integrated optics have resulted in reduced waveguide propagation losses (below 0.3 dB/cm), this work has not been extended to guided wave modulators where optical absorption by modulator electrodes can increase the loss above that of a simple waveguide. In these prior art devices electrode absorption can increase the loss from the 0.3 dB/cm level by as much as 5 dB/cm in certain devices, e.g., Schottky barrier devices. Also losses reported for p-i-n modulators have been 2 dB/cm or more and the reported efficiencies ($\eta$) have been between 2-3 degrees/V-mm. Although it has been shown that reduced losses are achievable by reducing the separation between the guided optical mode and the electrodes, this approach reduces the device efficiency (e.g., phase shift per applied voltage per device length).

Details of the aforementioned prior art may be found in the following publications which are incorporated herein by reference: K. Hiruma, et al, Appl. Phys. Lett., 47,186 (1985); E. Kapon, et al, Appl. Phys. Lett., 50,1628 (1987); R. J. Deri, et al, Appl. Phys. Lett., 51,791 (1987); P. Buchmann, et al, Electron. Lett., 20 (7), 297 (1984); S. H. Lin, et al, Electron. Lett., 22,935 (1986); and R. G. Walker, et al, Electron. Lett., 19,950 (1983).

SUMMARY OF THE INVENTION

The low loss semiconductor waveguide modulators of the present invention comprise an epitaxy layer structure designed to minimize optical absorption by the electrode regions while maintaining device efficiency. The novel waveguide modulator comprises a substrate having thereon sequential epitaxial layers, a first layer being a first electrode layer followed by a first confinement layer, a waveguiding layer, a second confinement layer and a second electrode layer. The indices of refraction of the respective layers are such that the index of refraction of the confinement layers are substantially lower than the index of refraction of the waveguiding layer and the index of refraction of the first electrode layer is substantially higher than that of the first confinement layer. In the preferred embodiment the index of refraction of the second electrode layer is also substantially higher than the index of refraction of the second confinement layer resulting in a w-shaped refractive index going from the first electrode layer to the second electrode layer.

DETAILED DESCRIPTION OF THE INVENTION

Low-loss optical waveguide modulators on semiconductor substrates are important for opto-electronic integrated circuit technology which combines optical and electronic devices on a single chip for optical communication systems. With lower loss, more optical signal processing can be performed on a chip. We have now discovered a device structure wherein we have demonstrated a low loss phase modulator fabricated on a semiconductor substrate utilizing a novel epilayer structure to reduce the propagation loss to $\leq 1$ dB/cm without sacrificing modulator efficiency as compared with prior art devices.

While the particular device described herein is a p-i-n diode/heterostructure waveguide employing a GaAs substrate and a GaAs/AlGaAs heterostructure, it will be understood by those in the art that the invention is not limited to the particular structure shown or even to the particular materials employed but extends to any waveguide modulator utilizing an epilayer structure having the refractive index profile as set forth herein (including, for example, Schottky barrier and carrier injection devices as well as the p-i-n electro-optic devices specifically described herein).

The specific waveguide modulator described herein and shown with reference to FIGS. 1-4 is a low loss semiconductor optical waveguide phase modulator designed for use in the 1.5 micron wavelength region. The device is a p-i-n diode/heterostructure waveguide utilizing an epilayer structure in accordance with the present invention and achieves propagation losses below 1 dB without sacrificing modulator efficiency.

Figure 1:
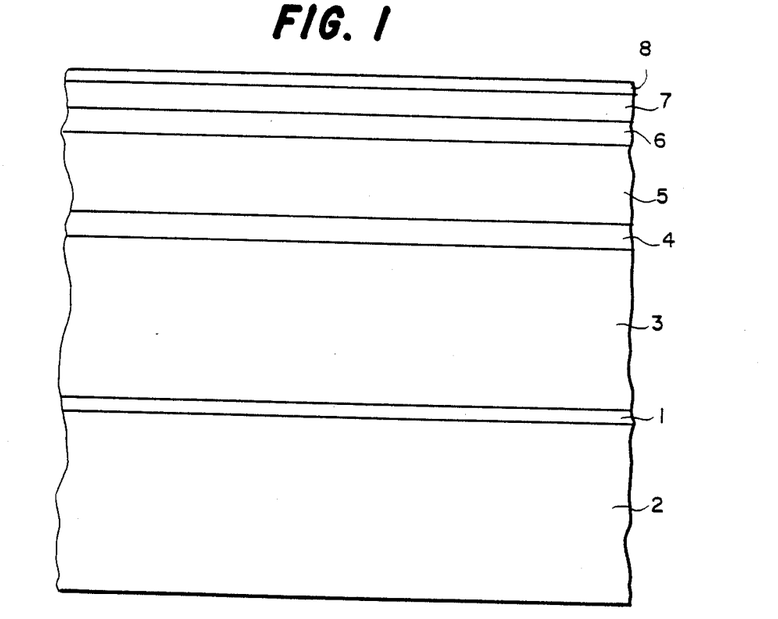
FIG. 1 is a schematic representation of a side cross-sectional view of the embodiment of the invention.

In the embodiment shown in FIG. 1 the electrodes are built into the modulator epilayers. This permits a large separation between metal contacts and the optical field, minimizing optical absorption in the metal. In addition, the electrical behavior of p-i-n structures should be less sensitive to fabrication variations than that of Schottky barrier devices and therefore are preferred from a manufacturing point of view. However, as previously pointed out, Schottky barrier device configurations can also be employed with the present invention. In order to minimize optical absorption by the doped semiconductor electrodes, a heterostructure with a W-shaped refractive index was employed. FIG. 1 shows the layer design, which consists of a 0.1 $\mu$m n+—GaAs buffer layer 1 on a GaAs single crystal substrate 2, a 5 $\mu$m n-$Al_{0.05}Ga_{0.95}As$ first electrode layer 3, an effective 0.4 $\mu$m i-$Al_{0.25}Ga_{0.75}As$ first confinement layer 4, a 1.6 $\mu$m i-GaAs guiding layer 5, an effective 0.4 $\mu$m i-$Al_{0.25}Ga_{0.75}As$ second confinement layer 6, a 0.5 $\mu$m p-$Al_{0.25}Ga_{0.75}As$ second electrode layer 7, and an optical 0.2 $\mu$m p+-GaAs electrode cap layer 8. In this structure, as can be seen with reference to FIG. 2 where the 0 position is arbitrarily chosen at the beginning of the first confinement layer, undoped material with a large index difference (i.e., substantially lower n) from the i-GaAs guiding layer 5 is used to confine the optical field to the intrinsic materials, minimizing absorption in doped layers. Thin confinement layers are used to maximize the modulator efficiency. Typically, confinement layers of from 0.1 to 0.6 microns are preferred. The n-type first electrode layer 3 material is chosen with a larger refractive index than that of the first confinement layer 4. Similarly, the p-type second electrode layer 7 material is preferably of a higher index of refraction than the adjacent second confinement layer 6. This permits single-mode operation with a reasonable thickness of the GaAs guiding layer 5. For the structure of FIG. 1, single-mode behavior is obtained for a guiding layer thickness$\leq 3.1$ $\mu$m. In contrast, use of an aluminum mole faction x=0.25 in the n-$Al_xGa_{1-x}As$ first electrode layer 3 (wherein n=3.258) rather than x=0.05 (wherein n=3.350) as in FIGS. 1 and 2, requires a guiding layer$\leq 0.9$ $\mu$m for single-mode operation. Hence, optical coupling to the guiding layer is more difficult and the amount of coupled light transmitted may be reduced. The asymmetry of layer thickness in the structure about the guiding region is also preferred in that it compensates for the differing absorption coefficients of n- and p-type material. A relatively thick n-$Al_xGa_{1-x}As$ first electrode layer was chosen to prevent optical leakage into the n+-GaAs substrate. Thicknesses of from 1 to 8 microns of this layer are generally preferred.

The loss, $\alpha$, and efficiency, $\eta$, of this design were predicted from the relations $$\alpha = \sum_k \Gamma_k \alpha_k \tag{1}$$

$$\eta = \frac{\pi}{\lambda} n^3 r_{41} \left( \sum_j \Gamma_j \right) / \left( \sum_j t_j \right), \tag{2}$$

where $T_k$ is the fraction of the optical intensity in layer k, tj is the thickness of layer k, $\alpha_k$ is the optical absorption coefficient of layer k, $r_{41}=1.5\times 10^{-12}$m/V is the electro-optic coefficient for (100) GaAs, n is the refractive index of GaAs, and $\lambda$ 0 the free-space wavelength. The sums are taken over all layers in eq. (1) and over the undoped layers in eq. (2); this assumes operation with complete depletion of the undoped material. Absorption coefficients $\alpha_k$ were obtained from the literature for n-GaAs; however, no data is available for p-GaAs or doped AlGaAs for the 1.3–1.5 $\mu$m wavelength range of interest. The absorption of p-GaAs was therefore estimated from measurements at $\lambda_0 > 2.06$ $\mu$m and $\lambda_0 < 0.95$ $\mu$m, and the loss in doped $Al_xGa_{1-x}As$ assumed equal to that in doped GaAs:

$$\alpha_n(dB/cm) = 1\times 10^{-17} n(cm^{-3}) \tag{3}$$

$$\alpha_p(dB/cm) = 1.5\times 10^{-16} p(cm^{-3}). \tag{4}$$

Based on eqs. (1–4) we estimate $\alpha = 0.1$ dB/cm due to electrode absorption and n=2.8 deg/V-mm for the design of FIG. 1.

The epilayer structure of FIG. 1 was grown by molecular beam epitaxy on a (100) n+-GaAs substrate in a Varian GENII MBE system. A substrate temperature of 680° C. was used for all $Al_xGa_{1-x}As$ and superlattice layers, and 580° C. was used for all GaAs layers. Doping densities were $2\times 10^{17} cm^{-3}$ in the n- and p-$Al_xGa_{1-x}As$ electrode layers and $2\times 10^{18} cm^{-3}$ in the GaAs cap layer. Si and Be dopants were used for n- and p-type material, respectively. The n-$Al_{0.25}Ga_{0.75}As$ was replaced by a superlattice of alternating epilayers of 3.4 nm GaAs/ 16.6 nm $Al_{0.30}Ga_{0.70}As$ to maintain a smooth interface morphology. Analyses of the epilayers by SIMS and scanning electron microscopy were consistent with the effective nominal n-$Al_{0.25}Ga_{0.75}As$ structure.

Devices were fabricated by wet etching waveguide ribs of width 4 to 6 $\mu$m and height 1 $\mu$m into the epilayers through a photoresist mask, depositing 0.27 $\mu$m $SiN_x$ by plasma-enhanced chemical vapor deposition, opening holes for p-side contacts through the $SiN_x$ on top of the ribs, and depositing 0.5 $\mu$m Cr/Au p-side contacts. Diode isolation was performed by wet etching 70 $\mu$m wide mesas around each rib down to the n-$Al_xGa_{1-x}As$. Samples were then thinned to 100 $\mu$m and the n-side metallized (20 nm Au:Ge/100 nm Au, annealed 420° C.). In addition, a set of unmetallized waveguides and a set of broad area diodes (50 $\mu$m stripes) were fabricated from the same wafer. Breakdown voltages>35 volts were obtained with the broad area diodes; lower breakdown voltages were occasionally observed in waveguide modulators, presumably due to imperfections in fabrication. A depletion width at zero-bias of $\approx 2$ $\mu$m was determined from the zero-bias capacitance, suggesting a residual doping$< 10^{15} cm^{-3}$ in the nominally intrinsic region. Since the depletion width is comparable to the total thickness of the undoped layers, optical absorption by free carriers in these regions is negligible for these devices.

Figure 3:
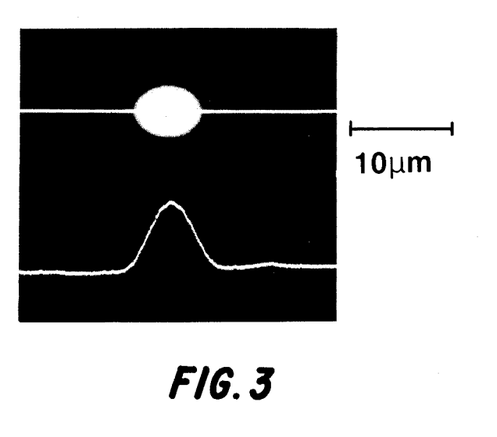
FIG. 3 is a photograph showing the optical near field intensity distribution of the device shown in FIG. 1.
Figure 4A:
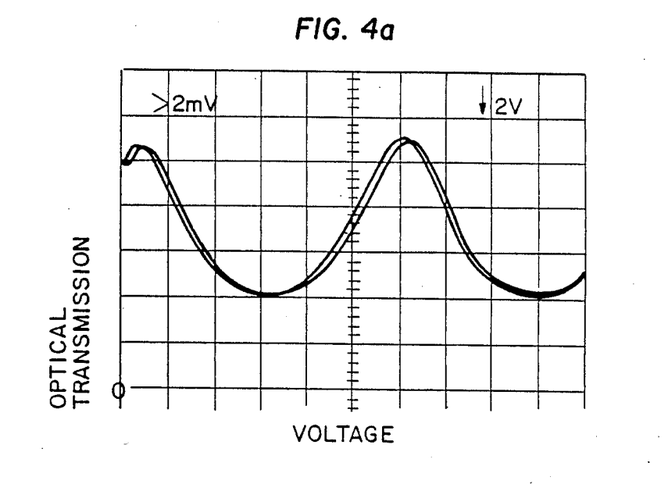
FIGS. 4(a) and 4(b) show voltage tuning curves plotting voltage versus transmission for the device of FIG. 1 used in a Fabry-Perot resonator configuration.
Figure 4B:
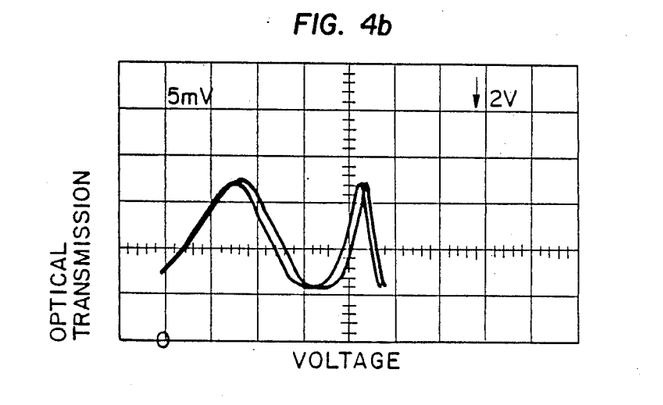

Optical characterization of the devices was performed with a 1.52 $\mu$m wavelength, TE-polarized HeNe laser using experimental methods known in the art. Devices of rib width 4 and 5 $\mu$m were single-mode, and 6 $\mu$m wide structures were slightly double mode; this behavior is consistent with that predicted by the effective index method. The optical near-field intensity distribution is shown in FIG. 3. A Fabry-Perot contrast technique was employed for propagation loss measurements with an accuracy of ±0.1 dB/cm, limited by uncertainties in the modal reflectivity of sample end facets. In this method, fringes of the Fabry-Perot resonator formed by the sample guiding structure and its two cleaved end faces were scanned by thermally tuning the optical phase between the facets. Modulator losses were also measured by using an applied voltage to vary the phase; losses determined by voltage tuning were in close agreement with those obtained by thermal tuning. It was found that the isolation etch described above complicated these measurements considerably by increasing the stray light (due to imperfect input coupling) in the vicinity of the guiding structure; stray light results in an overestimate of the propagation loss. Modulator efficiency was determined by the Fabry-Perot method as well; typical voltage tuning curves are shown in FIGS. 4(a) and 4(b).

Propagation losses of 0.4–0.8 dB/cm were measured for unmetallized modulator waveguides; guides with higher losses exhibited a greater number of photolithographic defects. These results show that the w-profile can significantly reduce optical attenuation due to absorption in the doped electrode regions. The difference between the experimental $\alpha=0.4$ dB/cm and the estimated electrode absorption of 0.1 dB/cm is consistent with the residual losses of 0.2–0.3 dB/cm reported for high-quality undoped waveguides; these residual losses have been attributed to scattering from rough epitaxial and rib boundaries.

Figure 2:
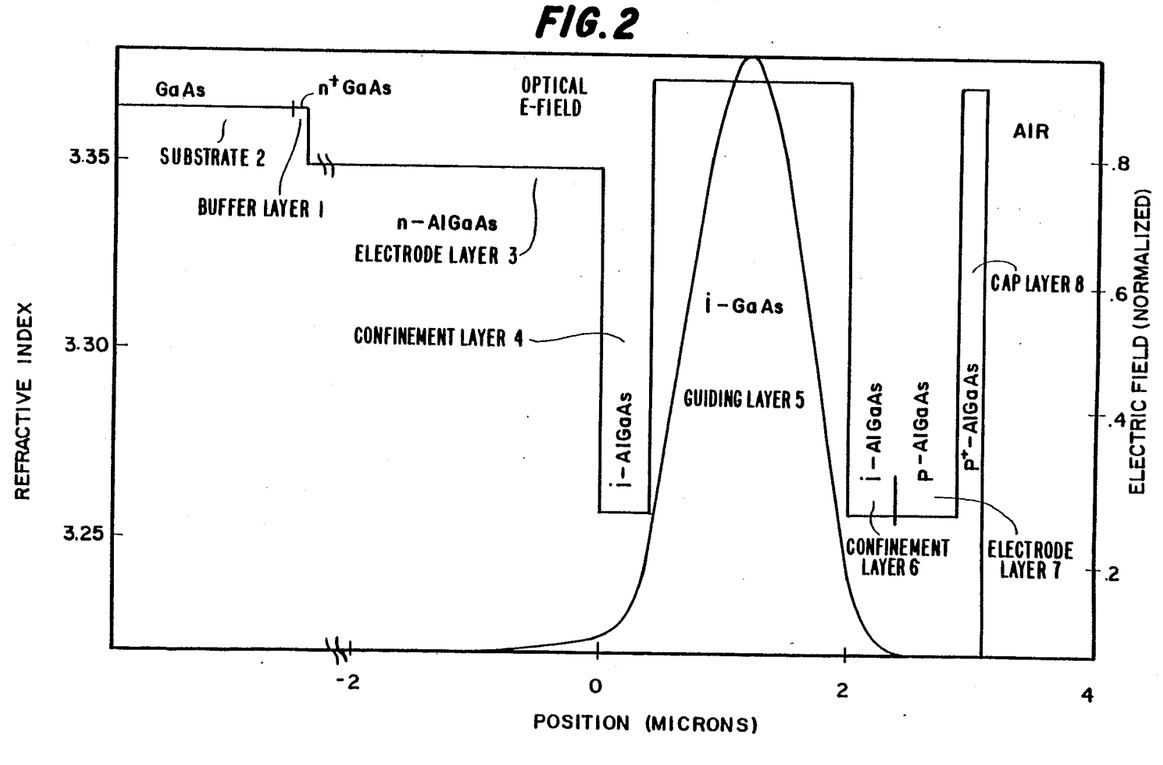
FIG. 2 depicts plots of the refractive index and electric field versus position of each layer on the substrate for the device shown in FIG. 1.

Larger losses, 0.8–1.2 dB/cm, were obtained in metallized waveguide modulators. As discussed above, metallization should not substantially alter the loss because the electrode structure of the novel device is built into the epilayers and as shown in FIG. 2, the optical field does not penetrate to the metal surface. The small observed loss increase may be attributable to measurement difficulties associated with the diode isolation etch; such an etch was performed only for metallized devices. Fabrication-related difficulties may also play a role in the increased losses associated with metallization. For example, additional absorption due to the $\approx 0.5$ μm overhand of the metal over the top of the waveguide rib (FIG. 1) may occur. In addition, the loss due to photolithographic defects in the waveguide rib may increase with subsequent metallization, which changes the nature of the dielectric discontinuity at the defects. In any case, the small observed additional loss in metallized devices is not intrinsic to the modulator design.

The voltage tuning behavior of metallized waveguides (FIG. 4) demonstrated an efficiency $\eta=2.9$ deg/V−mm, which is in reasonable agreement with the value predicted above (2.8 deg/V−mm). No modulation was observed for TM polarized light, confirming that the tuning resulted from the electro-optic effect. For modulator diodes with lower breakdown voltages (FIG. 4b), the onset of breakdown was readily recognized by an increase in the measured device current and by a more rapid tuning of the device (due to thermal and carrier injection effects). These data confirm that the improved attenuation of the W-profile design is not obtained at the expense of reduced efficiency.

The following Table is a comparison of the propagation loss (dB/cm) and modulator efficiency (deg/V−mm) of various prior art waveguide modulators with a waveguide in accordance with the present invention at a wavelength of 1.3–1.5 microns.

TABLE I

COMPARISON WITH PREVIOUS WORK ($\lambda= 1.3-1.5u$)

| Modulator Type | Propagation Loss (dB/cm) | Modulator Efficiency (deg/V-mm) | Reference |
|---|---|---|---|
| Schottky | 2 (may not include electrode absorption) | 3.8 | Walker + Jones, IEE colloq. heterostructure optoelectron, high speed D 93, 491 (1984) |
| Schottky | 7 | 2.2 | Buchmann et al, Electron Letts. 20, 297 (1984) |
| p-i-n | 2 | 2.3 | Lin et al, Electron Letts. 22, 934 (1986) |
| W-profile-Bellcore | | | |
| p-i-n calc'd | 0.1 (electrodes only) | 2.8 | |
| exp't'l | ~0.4 | (2.9) | |

Figure 5:
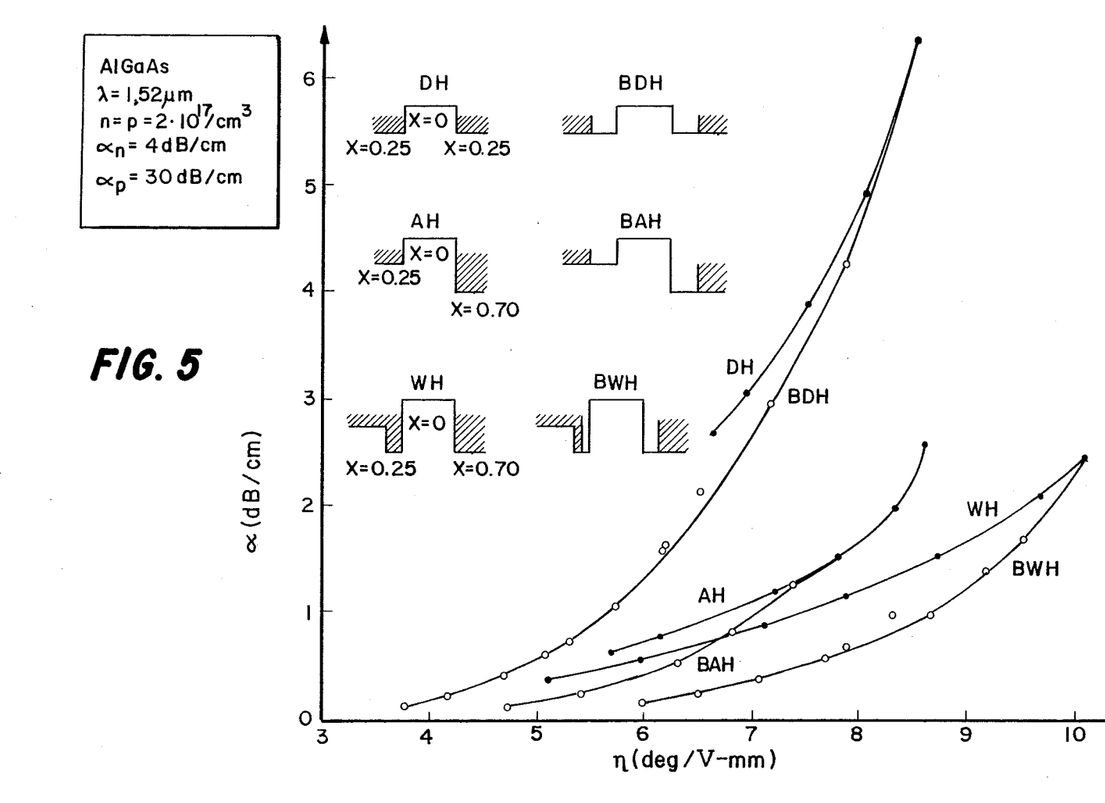
FIG. 5 is a plot of calculated loss versus efficiency for waveguide modulators having various refractive index profiles including prior art and novel profiles as indicated by the inserts in the figure. This figure indicates the trade-off generally found in the various device configurations between efficiency and loss.
Figure 6:
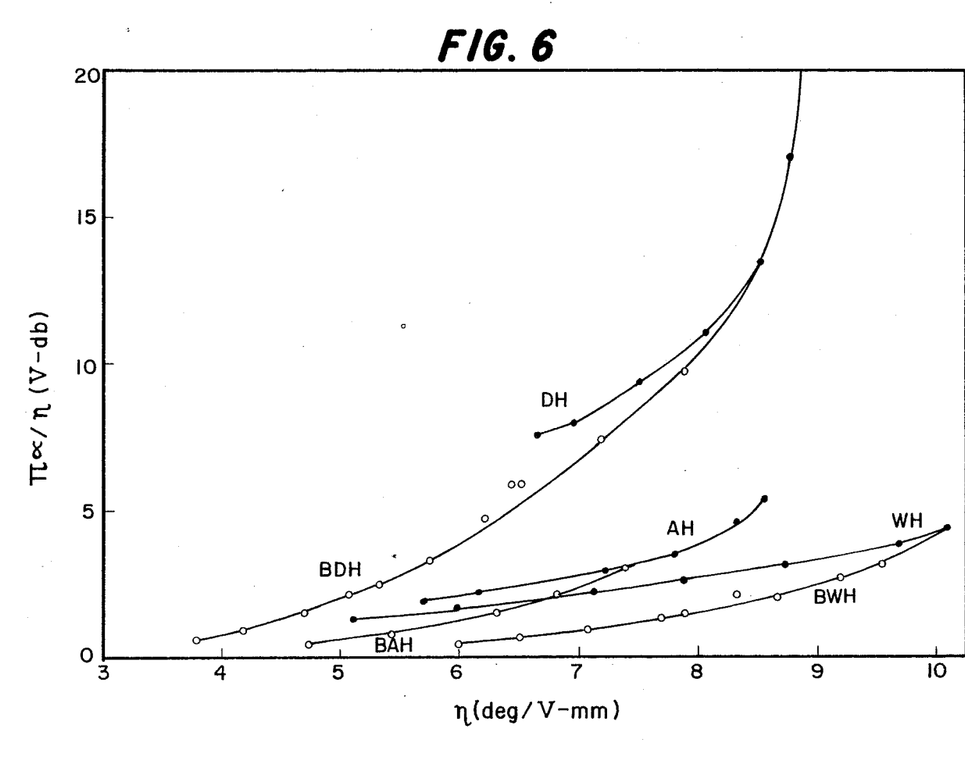
FIG. 6 which is a plot of pi $\times$ the ratio of loss to efficiency in volt dBs versus efficiency in degrees/volt-mm describes the loss in length of modulator versus efficiency for various index of refraction profiles.
Figure 7:
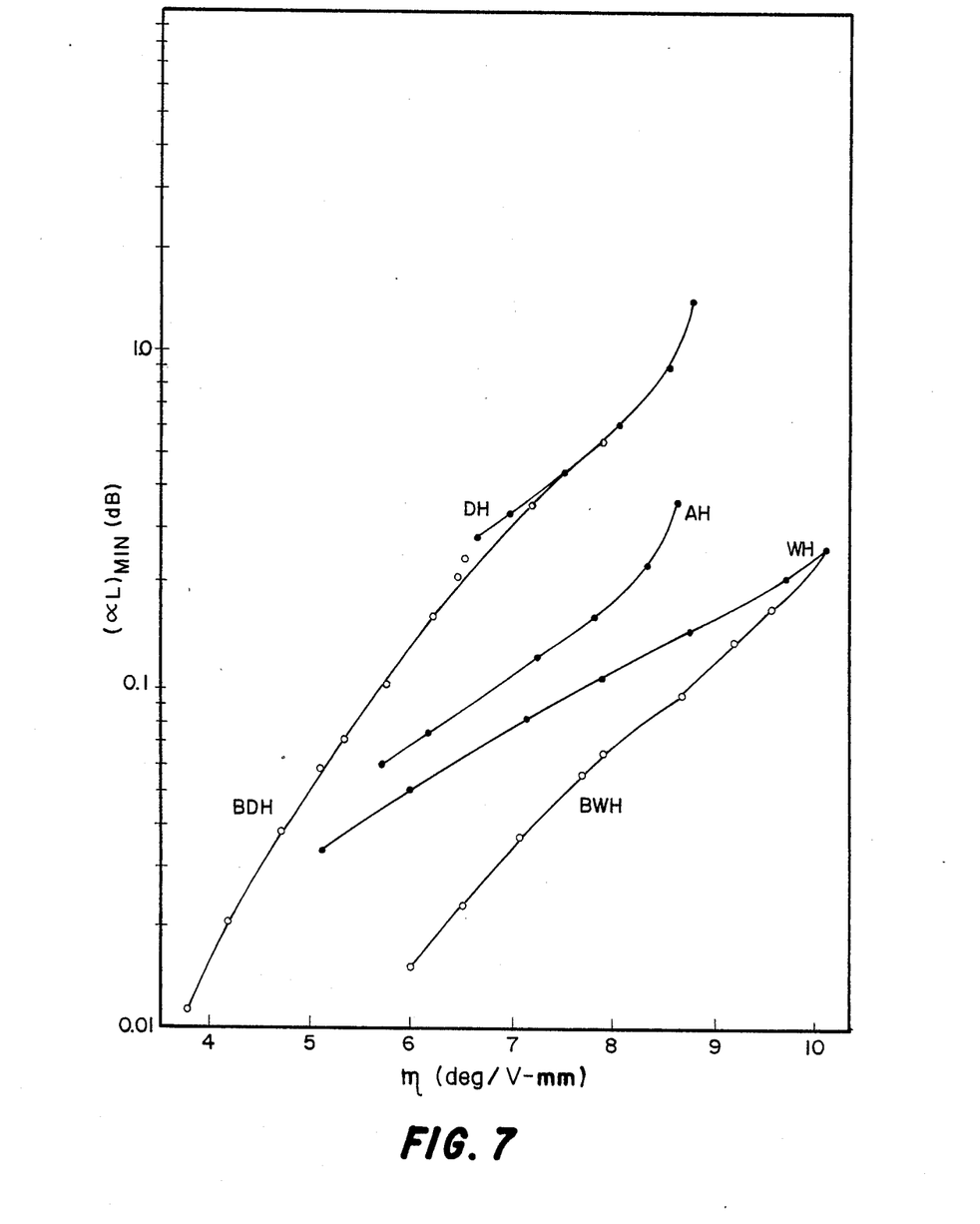
FIG. 7 is a plot showing minimum modulator loss (a$\times$1 min) versus efficiency for devices having various index of refraction profiles.

FIGS. 5–7 are "figure of merit" plots of waveguide modulators having various refractive index profiles. FIG. 5 contains an insert showing prior art waveguide modulator refractive index profiles (DH and AH) some alternatives to these prior art profiles (BHD and BAH) as well as refractive index profiles (WH and BWH) of waveguide modulators made in accordance with the present invention. In FIG. 5 the waveguide modulator efficiency $\eta$, (amount of modulation per device length per applied voltage) is plotted as a function of propagation loss, $\alpha$. The most desirable structures have a large $\eta$ and a small $\alpha$. As can be seen from the series of curves for devices of various refractive index profiles, devices having the novel index profile configuration, and particularly the BWH index profile wherein the electrodes are separated from the guiding region such that the E-field does not overlap the electrode region, exhibit the lowest loss while maintaining high efficiency. The devices all employ an i-GaAs guiding layer and a GaAs/$Al_xGa_{1-x}As$ heterostructure.

In FIG. 6, the device loss for a device requiring a drive voltage of one volt ($\pi\alpha/\eta$) is plotted against efficiency. For a 10 volt drive, the device loss is 1/10 $\pi\alpha/\eta$. It is shown here that devices with our novel index profile maintain the lowest losses per volt of drive voltage with increasing efficiency.

In FIG. 7, the smallest achievable device loss, $(\alpha L)_{min}$ as limited by maximum drive voltage and material properties, is plotted against efficiency. As can be seen devices having our novel index profile have and can maintain loss minimums at increasing efficiencies better than prior art index profiled devices.

In conclusion, a GaAs/AlGaAs electro-optic phase modulator with lower propagation loss (<1 dB/cm) and comparable efficiency to previously reported devices having a structure as taught and claimed has been demonstrated. A refractive index profile as taught herein minimizes optical absorption in doped electrode regions without sacrificing modulator efficiency. An increase of $\approx 0.4$ dB/cm in the loss due to device metallization was observed; however, this increase is not intrinsic to the device design as taught. The epilayer design used in this work should also prove useful for other modulator types, such as those employing Schottky barriers or multiple quantum wells for improved efficiency. In addition, this design may prove particularly important for guided-wave devices operating at longer wavelengths (e.g., 10.6 μm) where free carrier absorption becomes a larger contribution to the propagation loss. Further, the novel invention is not limited to GaAs/AlGaAs heterostructures. For example devices based on indium phosphide substrates and having a heterostructure such as InP/InGaAsP are contemplated.

What is claimed:

1. A semiconductor waveguide modulator comprising a substrate having thereon sequential epitaxial layers all overlying one major surface of said substrate, said layers comprising, in the order named, a first electrode layer, a first confinement layer, a waveguiding layer, a second confinement layer and a second electrode layer wherein the indices of refraction of said first and second confinement layers are substantially lower than the index of refraction of said waveguiding layer and the index of refraction of said first electrode layer is substantially greater than that of the first confinement layer.

2. The waveguide modulator of claim 1 further comprising a buffer layer on said substrate and over which said first electrode layer is formed.

3. The waveguide modulator of claim 1 wherein the E-field associated with the light propagating along the waveguide is confined so as not to overlap said electrode layers.

4. The waveguide modulator of claim 1 wherein said modulator is in a design selected from a p-i-n, Schottky barrier, carrier injection and quantum-well type device design.

5. The waveguide modulator of claim 1 wherein said modulator has a p-i-n structure.

6. The waveguide modulator of claim 1 further comprising electrical circuit elements integrated with said modulator on the same substrate.

7. The waveguide modulator of claim 1 having a loss of $\leq 1$ dB/cm and an efficiency of at least 2 degrees/V−mm.

8. The waveguide modulator of claim 1 wherein said electrode layers are asymmetric in thickness and index of refraction with reference to said waveguiding layer.

9. A semiconductor waveguide modulator comprising a substrate having thereon sequential epitaxial layers comprising a first electrode layer, a first confinement layer, a waveguiding layer, a second confinement layer and a second electrode layer wherein the indices of refraction of said first and second confinement layers are substantially lower than the index of refraction of said waveguiding layer and the index of refraction of said first electrode layer is substantially greater than that of the first confinement layer, further comprising a semiconductor cap layer over said second electrode layer, said cap layer having a refractive index greater than that of said second electrode layer to provide a W-shaped refractive index profile.

10. A semiconductor waveguide modulator comprising a substrate having thereon sequential epitaxial layers comprising a first electrode layer, a first confinement layer, a waveguiding layer, a second confinement layer and a second electrode layer wherein the indices of refraction of said first and second confinement layers are substantially lower than the index of refraction of said waveguiding layer and the index of refraction of said first electrode layer is substantially greater than that of the first confinement layer, wherein at least one of said electrode and confinement layers is a superlattice heterostructure.

11. A semiconductor waveguide modulator comprising a GaAs substrate having thereover sequential epitaxial layers comprising aluminum gallium arsenide and gallium arsenide including a first doped aluminum gallium arsenide electrode layer, a first effective intrinsic aluminum gallium arsenide confinement layer, an intrinsic gallium arsenide waveguide layer, a second effective intrinsic aluminum gallium arsenide confinement layer and a second doped aluminum gallium arsenide electrode layer wherein one of said electrode layers is doped with an n-type dopant, and the other with a p-type dopant, and wherein the index of refraction of the two confinement layers are significantly lower than the index of refraction of said waveguide layers and the index of refraction of said first electrode layer is higher than that of said first confinement layer, said layered structure being assymetric and wherein during operation the E-field of the guided wave is confined so as to essentially not overlap said electrode layers.

12. The waveguide modulator recited in claim 11 wherein at least one of said electrode and confinement layers comprises a superlattice heterostructure including GaAs and AlGaAs.

13. The waveguide modulator recited in claim 12 wherein said superlattice has an effective composition of $Al_{0.25}Ga_{0.75}As$.

14. The waveguide modulator recited in claim 12 including an $n^+$-GaAs buffer layer between said substrate and said first electrode layer, said first electrode layer being n-type.

15. The waveguide modulator recited in claim 14 including a $p^+$-GaAs cap layer over said second electrode layer.

16. A semiconductor waveguide modulator integrated on a semiconductor device comprises a single crystal GaAs substrate, and sequential layers therein comprising a $N^+$-GaAs buffer layer, an $n$-$Al_{0.25}Ga_{0.75}As$ electrode layer, an effective $i$-$Al_{0.25}Ga_{0.75}As$ first confinement layer, an $i$-GaAs waveguide layer, an effective $i$-$Al_{0.25}Ga_{0.75}As$ second confinement layer, a $p$-$Al_{0.25}Ga_{0.75}As$ second electrode layer and a $p^+$-GaAs cap layer, the layer thicknesses being such that the E-field of light propagated along the waveguide is essentially confined to the region which includes the waveguide layer and surrounding confinement layers, said waveguide modulator having a loss at a wavelength of 1.5 μm of $\leq 1$ dB/cm and an efficiency of at least 2 degrees/V−mm.

* * * * *

UNITED STATES PATENT AND TRADEMARK OFFICE
CERTIFICATE OF CORRECTION

PATENT NO.  : 4,943,133
DATED       : July 24, 1990
INVENTOR(S) : Robert J. Deri and Elyahou Kapon It is certified that error appears in the above-indentified patent and that said Letters Patent is hereby corrected as shown below:

Column 3, line 20, "0.1" should read --0.2--.
Column 4, line 17, "1×10" should read --2×10--.

Signed and Sealed this

Third Day of May, 1994

Attest:

BRUCE LEHMAN

Attesting Officer

Commissioner of Patents and Trademarks